(12) United States Patent
Inoue et al.

(10) Patent No.: US 6,980,394 B2
(45) Date of Patent: Dec. 27, 2005

(54) SPINDLE MOTOR AND RECORDING DISK DRIVING DEVICE COMPRISING THE SAME

(75) Inventors: Tatsuhide Inoue, Kyoto (JP);
Tomohiro Hasegawa, Kyoto (JP);
Masaaki Kuroki, Kyoto (JP);
Kiyoyuki Shimizu, Maebashi (JP);
Mitsuhiro Kurino, Kodaira (JP);
Yoichi Sekii, Kyoto (JP); Hironori Ando, Kyoto (JP); Naohisa Horio, Kyoto (JP)

(73) Assignee: Nidec Corporation, Kyoto (JP)

( * ) Notice: Subject to any disclaimer, the term of this patent is extended or adjusted under 35 U.S.C. 154(b) by 0 days.

(21) Appl. No.: 10/904,380

(22) Filed: Nov. 8, 2004

(65) Prior Publication Data
US 2005/0135003 A1 Jun. 23, 2005

(30) Foreign Application Priority Data

Nov. 7, 2003 (JP) .............................. 2003-377740
Dec. 1, 2003 (JP) .............................. 2003-401309

(51) Int. Cl.$^7$ ........................... G11B 17/02; H02K 7/08
(52) U.S. Cl. ...................... 360/99.08; 310/90; 384/112
(58) Field of Search .............................. 369/263, 264, 369/261, 269, 258, 100; 360/99.08, 99.04, 360/97.01, 99.12; 310/90, 254, 261, 272; 384/112, 114, 107

(56) References Cited

U.S. PATENT DOCUMENTS

| 6,097,121 | A | * | 8/2000 | Oku ............................. 310/91 |
| 6,768,236 | B2 | * | 7/2004 | Tokunaga et al. ............. 310/90 |
| 6,804,987 | B2 | * | 10/2004 | Kloeppel et al. .............. 73/10 |
| 6,809,898 | B1 | | 10/2004 | Prochazka ............... 360/99.08 |
| 6,826,010 | B2 | | 11/2004 | Yoshikawa et al. ...... 360/99.08 |
| 6,914,358 | B2 | * | 7/2005 | Tokunaga et al. ............. 310/90 |

FOREIGN PATENT DOCUMENTS

| JP | 2001-032827 A | 2/2001 |
| JP | 2001-118314 A | 4/2001 |
| JP | 2003-153491 A | 5/2003 |

* cited by examiner

*Primary Examiner*—Ali Neyzari
(74) *Attorney, Agent, or Firm*—Judge Patent Firm

(57) ABSTRACT

In the present invention, to reduce the noise of a spindle motor, a bush member is interposed between a base plate and an FDB unit. The base plate is a base of the spindle motor and of which a case of a hard disk drive is consisted. The FDB unit is a bearing unit which has a shaft, a sleeve having an inner peripheral surface opposed to an inner peripheral surface of the shaft, and a bearing housing formed integrally with the sleeve.

22 Claims, 6 Drawing Sheets

Measurement Result

|  | OverAll | Wave Element 1 | Wave Element 2 | Wave Element 3 |
|---|---|---|---|---|
|  | [dBA] | [dBA] | [dBA] | [dBA] |
| Prior type | 31.8 | 21.5 | 19.6 | 12.8 |
| Bush type | 33.2 | 8.2 | 13.7 | 17.7 |

FIG. 6

SPINDLE MOTOR AND RECORDING DISK DRIVING DEVICE COMPRISING THE SAME

BACKGROUND OF THE INVENTION

1. Field of the Invention

The present invention relates to a spindle motor rotating a recording disk and a recording disk driving device comprising the spindle motor.

2. Background Art

In a hard disk drive (HDD) which is one of large-capacity information recording devices, the storage capacity per unit area of a disk plate as a recording medium thereof has been increased. Therefore, the information storing capability of HDD has been increased, and the size has been reduced.

Corresponding to this, with regard to applications of HDD, in addition to a conventional application as an auxiliary memory of a computer, opportunities in which a hard disk is used for a video/audio equipment or a portable equipment have been increased. Furthermore, a computer itself has more often been used in a quiet environment such as in office and at home. Therefore a less noisy HDD as compared to the conventional one has been sought. In order to meet these demands, for a bearing of the spindle motor (hereinafter, merely refer to a motor) mounted on the HDD, a fluid dynamic bearing (FDB) has been used instead of a ball bearing (BB) having large sliding noise. In addition, in order to achieve miniaturization and reduction in thickness of the HDD and realize a low cost, a base plate in which a part of a case of the HDD and a bracket composing a base part of the motor are integrally formed has been used.

In the HDD using the FDB and the base plate, noise has been remarkably decreased as compared with the conventional BB, while high frequency noise, which was inconspicuous due to the sliding sound of BB, all the more has posed a problem in relation to a natural frequency of the base plate.

Even at the same sound pressure level, a loudness of a sound that can be captured by human auditory sense differs depending on the frequency of the sound. In particular, it is known that sound of 1000 to 7000 Hz tends to sound larger as compared with that in another range, which is noise discomforting a human. It is known that the frequencies that human auditory sense can recognize are about 20 to 20000 Hz. In the HDD using the FDB and the base plate, it is a problem to reduce, in particular, a noise frequency range of 1000 to 7000 Hz.

Causes of Noise—As a major cause of generating such noise having the frequency range of 1000 to 7000 Hz, there is a switching noise of a brushless motor. The spindle motor mounted on the HDD is a DC brushless motor, in which by switching a current through a coil in forward and backward directions in a constant period depending on a rotational speed of the motor, a rotating magnetic field induced by the switching current according to the switching period is generated in a field around a stator which the coil is wound around. The rotating magnetic field generates a magnetic attracting force and a magnetic repulsive force together with a magnetic field formed by a rotor magnet to thereby rotate a rotor.

All the magnetic attracting force and the magnetic repulsive force are not used to rotate the rotor but a part of these forces are used to generate a periodic vibration. Such vibration is referred to as an electromagnetic vibration. This vibration includes a plurality of different frequency components, and to obtain which frequency has large vibration energy, a waveform of the vibration is extended into Fourier series and we can find each frequency coefficient of Fourier series which corresponds to vibration energy of the frequency.

For the spindle motor, a three-phase brushless motor is generally used and the electromagnetic vibration generated in the rotor magnet has three peaks at the frequency order obtained by multiplying the number of poles of the rotor magnet by three, that is, the number of the phases, at the frequency orders of its integer multiples (these are referred to as "basic orders") and at the frequency orders before and after the above-mentioned orders. For example, in the case of a four-pole rotor magnet, they are 11th, 12th, 13th, 23rd, 24th, 25th, 35th, 36th, 37th, 47th, 48th, 49the like. Here, the order denotes an integer value obtained by dividing each frequency component of the vibration frequency by the number of revolution. It is known that the number of poles of a general rotor magnet is 4 to 24 and the vibration has a plurality of amplitude peaks in a range of about 11th to 350th frequency orders, in particular, in a range of 20th to 100th. This frequency of vibrations is about 1200 to 20000 Hz in a motor performing steady rotation of 3600 to 12000 per minute, which corresponds to sound from a range that can be heard well by human auditory sense to the highest range that can be recognized by human auditory sense. That is, at least one of the causes of generating uncomfortable noise generated from the base plate is this electromagnetic vibration. This electromagnetic vibration is generated in the rotor magnet and the stator, respectively.

As causes of generating, in particular, the noise of 1000 to 7000 Hz in the HDD using the above-mentioned FDB and base plate, the following two are considered.

First cause of noise generation—Firstly, among this electromagnetic vibration generated in the rotor magnet, there is a vibration transmitted to the base in non-contact. This vibration corresponds to the electromagnetic vibration having peaks at the frequency orders before and after the basic orders, for example, in the case of the four-pole rotor magnet, the 11th, 13th, 23rd, 25th, 35th, 37th, 47th, 49th orders and the like.

The rotor magnet is one of sections where the electromagnetic vibration is generated, and the vibration generated in the rotor magnet is transmitted to the FDB unit through a rotary member. In the FDB unit, a lubricating fluid is interposed between the rotary side and the stationary side in members composing the FDB unit and the FDB unit is supported in a non-contact state. The member on the rotary side and the member on the stationary side composing the FDB unit are opposed to each other through a very minute clearance, and further a dynamic pressure of the lubricating fluid increased by rotation generates sufficient rigidity to support a shaft. Therefore, even if the FDB unit supports the shaft in non-contact by interposing the fluid, the vibration which has been generated in the rotor magnet and transmitted to a bearing through the rotary member is partially transmitted to the base plate.

Conventionally, the base plate has been directly attached to the FDB unit. Therefore, the vibration generated in the rotor magnet is transmitted to the FDB unit and also to the base plate. When the frequency of the vibrations coincides with both a natural frequency and a vibration mode that the base plate has, a resonance occurs to generate a large noise.

Second cause of noise generation—A second noise is generated by another electromagnetic vibration which is caused by the same as in the first cause and transmitted to the base in contact. Among the electromagnetic vibration, there is a vibration directly transmitted from the stator to the base plate. The electromagnetic vibration having peaks at the above-mentioned basic frequency orders corresponds to this, for example in the case of a four-pole rotor magnet, the electromagnetic vibration of 12th, 24th, 36th, 48th orders and the like correspond to this.

This vibration is also similar to the vibration generated in the rotor magnet, and is about 1200 to 20000 Hz, which corresponds to the sound from the range that can be heard well by human auditory sense to the highest range that can be recognized by the human auditory sense. The base plate is directly vibrated by this stator, and when the natural frequency of the base plate is close to the number of vibration of the stator, the resonance occurs, thereby generating a large noise.

Problems—In order to eliminate these causes of vibration, one way is to decrease the natural frequency of the base plate or to prevent the frequencies of the electromagnetic vibration generated by the stator and the rotor magnet from coinciding with each other, which allows resonance not to occur.

However, the reduction in thickness and the miniaturization of HDD make it difficult to freely change the design of the base plate, and the natural frequency becomes higher and higher. Furthermore, since the number of poles of the rotor magnet, the number of magnetic poles of the stator and the like largely affect other properties such as the torque of the motor, it has been difficult to easily change the design.

On the other hand, as the applications of HDD are increased, the model and specification of a motor used for HDD become more and more various. It is difficult with one or a few basic models to satisfy respective conditions such as the size, a number of discs, a number of revolutions, and use environments where recording disks are used. Therefore, when a member composing a motor including the FDB unit is changed according to changing the specification, the whole motor including the base plate, a facility for producing the motor such as jigs and the like may need to be remade. In particular, the base plate is manufactured by using a die casting or press working, and thus a very high-cost metal mold should be changed to change a shape of the base plate. Furthermore, high processing accuracy and durability are required of the jigs, which are very expensive. In addition, an increase in the number of types makes not only the maintenance difficult but also the handling complicated.

BRIEF SUMMARY OF THE INVENTION

A first object of the present invention is to provide a motor in which uncomfortable noises are reduced.

A second object of the present invention is to provide a recording disk drive in which uncomfortable noises are reduced.

In a motor whose base is a base plate, a major cause of noise is a noise due to the resonance of the base plate. In the case where this motor is used for a recording disk, the base plate makes up a part of a case of a recording disk drive. Accordingly, if the base plate generates a noise, the noise is recognized as the noise of the recording disk itself by a user.

In the present invention, to reduce the noise, a bush member is interposed between a base plate and an FDB unit, the base plate which is a part of a transmission path of vibration. Furthermore, it is advantageous that a stator is attached to the base plate via the bush member. This structure having the bush member as a damper damps the electromagnetic vibration of a rotor magnet transmitted via the FDB unit and the other electromagnetic vibration generated in the stator, thereby reducing the noise of the motor.

In this case, when an adhesive agent is interposed in a joint part between this bush member and the base plate and a joint part between the base plate and the FDB unit, the vibration is damped in the joint parts, because the elasticity of the adhesive agent may absorb the vibration energy.

Meanwhile, when the base plate and the bush member are made of different materials, for example, the base plate is made of aluminum and the bush member is made of stainless steel, steel, synthetic resin, rubber, copper, and copper alloy or the like, a natural frequency of the base plate is changed, so that adjustment for an optimum natural frequency is enabled. In particular, different specific gravities of the base plate and the bush member are effective to changing the natural frequency. In such a case, it is advantageous to join the bush member and the base plate at a high joint strength.

It is advantageous that the bush member itself is made of a material easy to absorb the vibration energy. For example, the use of synthetic resin, synthetic rubber, natural rubber, Mg-Zr or the like increases an internal loss of the vibration, so that the vibration transmitted to the bush member can be damped inside of the bush member, thereby reducing the vibration of the base plate.

In addition, by making a design so as to combine a plurality of means described above according to a rotational property, vibration property, noise property, and bearing property of the motor, an optimum noise reduction matching the properties of the motor can be accomplished.

Furthermore, in the present invention, unitization is achieved so that a bearing can be manufactured with only the FDB part separated, and the FDB unit is attached to the base plate via the bush member. That is, even the FDB unit of a different specification and model can be attached to the same base plate. The same FDB unit can also be attached to the base plate of a different specification and model. That is, only by changing the design of the bush member, a plurality of specifications can be easily coped with. Accordingly, costs and time taken for production facility can be reduced and time and costs required for developing the FDB unit, the base plate, and jigs can be largely reduced. In addition, since complication of controlling and maintaining jigs corresponding to the number of models is also reduced, productivity can be increased.

Furthermore, by using the motor of the present invention, a recording disk driving device in which the noise is reduced can be attained at low cost according to an application.

BRIEF DESCRIPTION OF THE DRAWINGS

FIG. 6 is a table showing a result in the case where the first embodiment of the present invention is carried out.

DETAILED DESCRIPTION OF THE INVENTION

Figure 1:
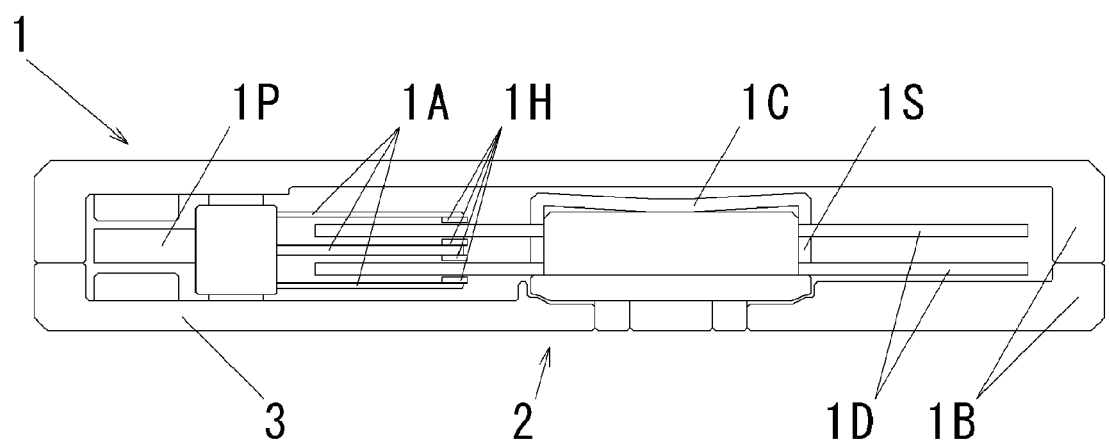
FIG. 1 is a longitudinal sectional view showing one embodiment of a hard disk providing with a motor for which the present invention is carried out.

A first embodiment that is one embodiment of the present invention is described in reference to the drawings. In the present embodiment, when an expression indicating a direction is used, it denotes a direction in the drawings as long as there is no special note, and does not limit a direction in practice.

First Embodiment

Figure 2:
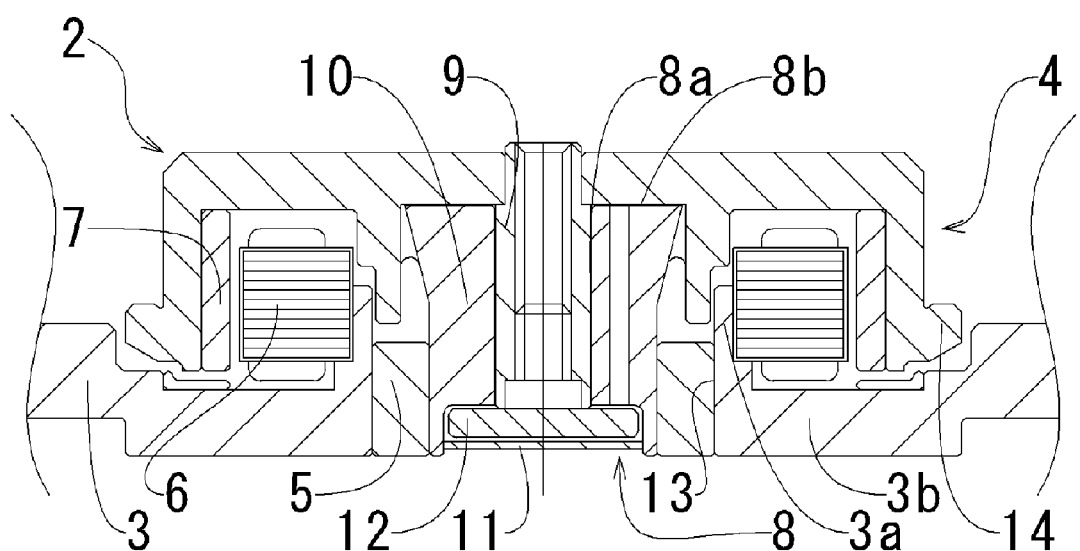
FIG. 2 is a longitudinal sectional view showing a first embodiment which is one of embodiments of the motor for which the present invention is carried out.

FIG. 1 is an HDD cross-sectional view showing the first embodiment of the present invention. FIG. 2 is a cross-sectional view of its motor part.

An HDD 1 is provided with a case 1B. A lower half of the case 1B composes a base plate 3 serving as a stationary member of a motor 2. Inside the case 1B, there are provided a recording disk 1D, the motor 2, a magnetic head 1H, an arm 1A supporting the magnetic head 1H and an actuator 1P. The recording disk 1D is placed on a rotor hub 4 of the motor 2 and rotates integrally with the rotor. The magnetic head 1H writes or reads information on the recording disk 1D by using a magnetic interaction. The magnetic head 1H is supported by the arm 1A and moved to an arbitrary position of the recording disk 1D by the actuator 1P.

The recording disk 1D is pressed against the rotor hub 4 in an axial direction by a damper 1C to be fixed to the rotor hub 4. Furthermore, in the case where a plurality of recording disks 1D are placed, a spacer 1S is arranged between the recording disks 1P. This damper is engaged with a rotary shaft or a rotor magnet by a screw.

The motor 2 is provided with the rotor hub 4, an FDB unit 8, a bush 5, a base plate 3, a stator 6 and a rotor magnet 7. In an outer peripheral surface of the rotor hub 4, a flange part 14 protruded outward in a radial direction is formed. On an upper end surface of the flange part 14, the recording disk 1D is set. The rotor hub 4 is supported rotatably with respect to the base plate 3 by the FDB unit 8. The rotor magnet 7 is attached to an inner peripheral surface of the rotor hub 4. The stator 6 is provided with a plurality of coils and arranged in a stationary state with respect to the base plate 3. The stator 6 and the rotor magnet 7 are arranged in opposition to each other in the radial direction. Thus, a magnetic attracting force and a repulsion force are generated periodically between the rotor magnet 7 and the stator 6, and the rotor magnet 7 is rotated with respect to the stator 6.

The FDB unit 8 used for a bearing is provided with a shaft 9 provided vertically in the rotor hub 4 and a sleeve 10 having an inner peripheral surface radially opposed to an outer peripheral surface of the shaft 9 to be composed. Furthermore, at a lower end of the shaft 9, a stopper flange 12 is screwed to limit upward movement of the shaft 9 with respect to the sleeve 10. The lower end of the sleeve is sealed by a counter plate 11.

A shallow groove in a herringbone shape (not shown) is formed in the inner peripheral surface of the sleeve 10 opposed to the outer peripheral surface of the shaft 9 via a radial minute clearance in the radial direction. Lubricating oil is retained in the radial minute clearance and a radial dynamic pressure bearing 8a is formed by this outer peripheral surface of the shaft 9, inner peripheral surface of the sleeve 10 and radial minute clearance formed therebetween, and the lubricating oil retained therebetween.

An upper end surface of the sleeve 10 perpendicular to the axis and a flat surface 4a on the lower side of the rotor hub 4 are opposed to each other via a minute clearance in an axial direction. In the upper end of the sleeve 10, a shallow spiral groove (not shown) is formed to retain the lubricating oil in the minute clearance. A thrust dynamic pressure bearing 8b is formed by this upper end of the sleeve 10, flat surface 4a on the lower side of the rotor hub and axial minute clearance formed therebetween, and lubricating oil retained therebetween.

This structure of the FDB unit 8 is merely one example of the dynamic pressure bearing. For example, by using another FDB unit shown in the drawing illustrating another embodiment of the present invention or another bearing mechanism, the effect of the present invention can also be attained.

The base plate 3 composing a part of the case 1B of the HDD 1 is made of a plate-like aluminum alloy and formed by press working. Aluminum is a light-weight metal, which is suitable for reducing the HDD 1 in weight. Furthermore, aluminum and its alloy are suitable for press working. The press working has higher productivity than a process such as cutting. In addition, both the case 1B of the HDD 1 and the stationary member of the motor 2, a process requiring sufficient complicacy and precision is possible.

For this base plate 3, stainless may be used as a material and dye casting or cutting may be used as a processing method in accordance with required strength and processing accuracy.

This base plate 3 has a hole 13 for fitting the bush 5 of the motor 2 therein. In a periphery of the hole 13, a cylindrical boss part 3a is formed upward and the stator 6 is fitted onto an upper outer peripheral surface of the boss part 3a. Furthermore, a base part where the boss part 3a is provided vertically is structured as a plate part 3b. The bush 5 is brought into contact with, and is fitted into, an inner peripheral surface of the hole 13 corresponding to both the boss part 3a and the plate part 3b. By interposing this bush 5, the FDB unit can be changed in accordance with the specification and the application while sharing the base plate 3.

Figure 3:
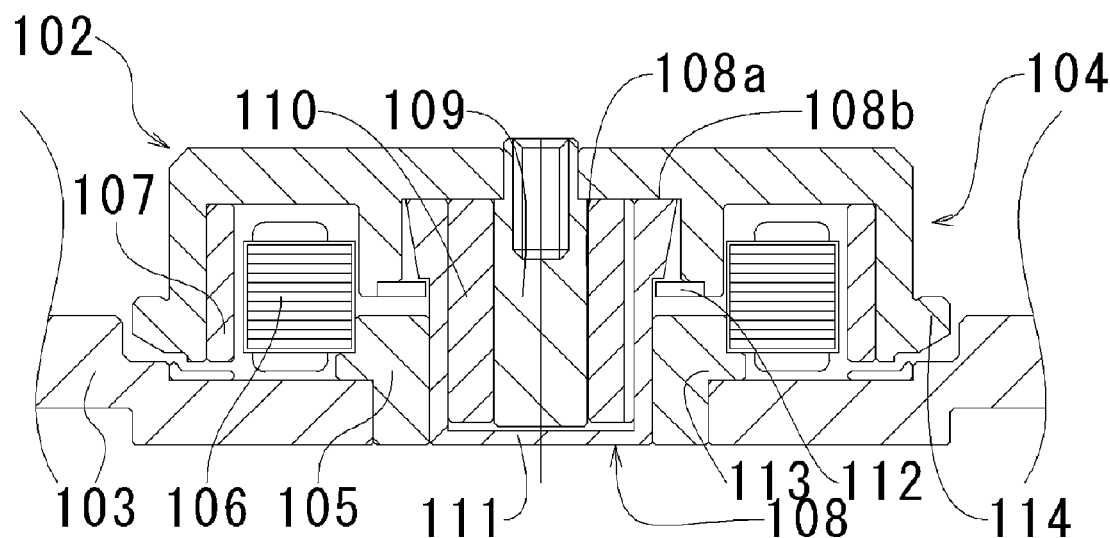
FIG. 3 is a longitudinal sectional view showing a second embodiment which is one of the embodiments of the motor for which the present invention is carried out.
Figure 5:
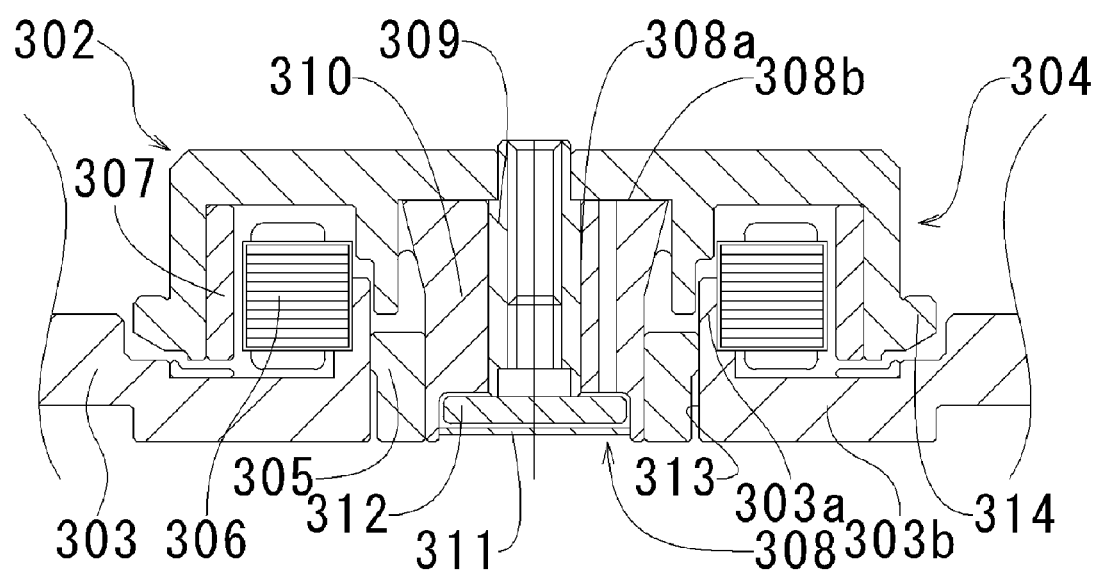
FIG. 5 is a longitudinal sectional view showing one of other embodiments of the motor for which the present invention is carried out.

As shown in FIG. 5 illustrating another embodiment of the present invention, the bush 5 and the base plate 3 may be brought into contact with each other only at an upper part of the boss part 3a. The boss part 3a can be deformed in a minute amount in the radial direction centering on the base part of the boss part 3a and the deformation absorbs vibration and reduces noise. Furthermore, as shown in FIG. 3 illustrating a second embodiment, a step may be formed so as to engage the bush 5 with the hole 13 of the base plate 3. This makes positioning in the axial direction easy and improves assembly workability.

Figure 4:
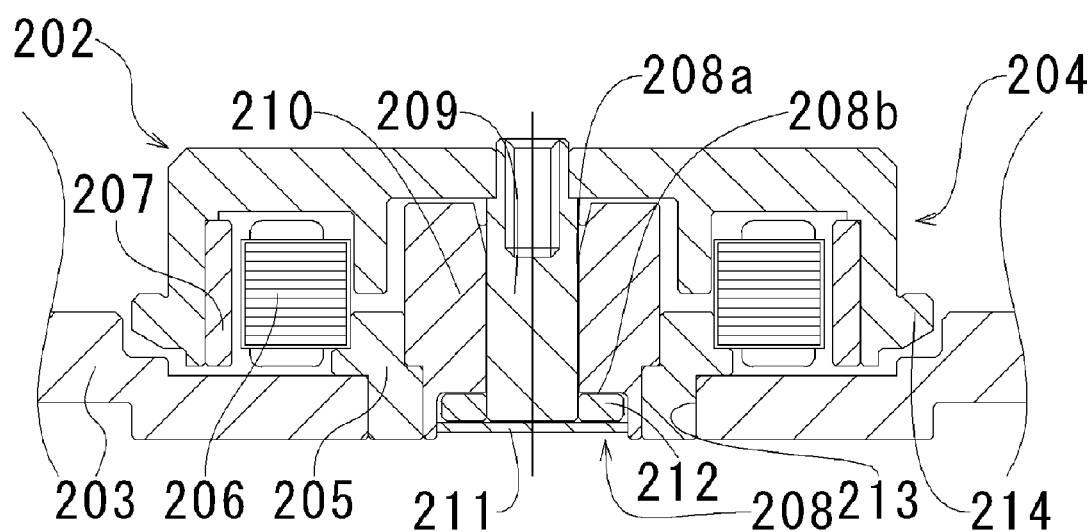
FIG. 4 is a longitudinal sectional view showing a third embodiment which is one of embodiments of the motor for which the present invention is carried out.

The FDB unit 8 is fitted into the inner peripheral surface of the bush 5 and fitted. The bush 5 is fitted onto an outer peripheral surface of the sleeve 10 of the FDB unit 8 to be bonded and fixed. The sleeve 10 composes the radial dynamic pressure bearing and thus, when stress is applied in the radial direction at the time of fixing, the inner peripheral surface composing the bearing can be deformed, thereby deteriorating performance of the bearing. Accordingly, the bonding and fixing is used for fixing the FDB unit 8 and the bush 5. An adhesive agent is interposed in the very minute clearance between the inner peripheral surface of the bush 5 and the outer peripheral surface of the FDB unit 8, and has an effect of absorbing and damping vibration. Accordingly, the vibration and noise which are generated in the rotor magnet 7 as a rotating body and transmitted from the rotor hub 4 to the base plate through FDB unit 8 can be reduced. As shown in FIG. 4 illustrating a third embodiment, a step may be formed in the outer peripheral surface of the FDB unit 8 and a step corresponding to the step may be formed in the bush 5 to engage with each other for positioning.

The motor 2 of the present embodiment is a three-phase DC brushless motor, the number of poles of the rotor magnet 7 is eight and the number of slots of the stator 6 is nine. An energizing method is a 120 degree sensor less drive.

The bush 5 is formed of stainless steel, which is largely different from aluminum used for the base plate 3 in specific gravity. Accordingly, the vibration mode of the base plate 3 is changed, thereby reducing the noise.

The bush 5 may be made of aluminum and its alloy, copper and its alloy, brass, steel or the like. Furthermore, in order to increase productivity and makes cutting work easy, a metal with a good cutting property may be used. When resin or metal with a large internal loss, for example, Mg-Zr or the like is used, the vibration is damped inside of the bush member 5, thereby reducing the noise.

For the joint between the bush 5 and the base plate 3, laser welding is used, which secures a high joint strength. This joint may be bonding and fixing. In the fixing by an adhesive agent, the joint strength is lower than that of the laser welding, but the adhesive agent can act as an elastic material, thereby abating the vibration and reducing the noise. An adhesive agent with an elastic coefficient of 0.1 to $10 \times 10^3$ MPa is preferable.

A table shown in FIG. 6 indicates comparison of sound components between a case in which the present invention is carried out and a conventional case. By carrying out the present invention, a frequency component (A) and a frequency component (B) which are conventionally the largest noise can be decreased. Although "Overall" indicating the whole noise is not decreased, the noise in the frequencies which are actually uncomfortable for human auditory sense is reduced, so that the noise recognized by a human is actually reduced largely.

Second Embodiment

FIG. 3 is a cross-sectional view showing the second embodiment which is one of the embodiments of the motor of the present invention.

A motor 102 of the present embodiment is mounted on the hard disk 1 having components similar to those of the first embodiment and rotates the recording disk 1D.

The motor 102 is provided with a rotor hub 104, an FDB unit 108, a bush 105, a base plate 103, a stator 106, and a rotor magnet 107. Among these, the stator 106 and the rotor magnet 107 are completely the same as the stator 6 and the rotor magnet 7, respectively.

In the present embodiment, the FDB unit 108 is provided with a shaft 109 and a sleeve internal cylinder 110 opposed to an outer peripheral surface of the shaft 109 in a radial direction. An outer peripheral surface of the sleeve 110 is covered with a substantially cup-shaped bearing housing 111. The bush 105 is attached to an outer peripheral surface of the bearing housing 111.

This sleeve 110 is formed of a sintered porous metal. Furthermore, the sleeve 110 is impregnated with lubricating oil.

A plurality of shallow grooves in a herringbone shape or in a step shape, or multi arc shaped are formed in an inner peripheral surface of the sleeve 110 opposed to the outer peripheral surface of the shaft 109 via a minute clearance in the radial direction. The lubricating oil is retained in the radial minute clearance and a radial dynamic pressure bearing 108a is formed by this outer peripheral surface of the shaft 109, inner peripheral surface of the sleeve 110 and radial minute clearance formed therebetween, and lubricating oil retained in the clearance.

For a thrust dynamic pressure bearing, an axial minute clearance is formed between an upper end surface of the bearing housing 111 and a flat surface 104a on the lower side of the rotor hub 104 opposed to the upper end of the bearing housing 111 in the axial direction. In the axial minute clearance, the lubricating oil is retained, and a thrust dynamic pressure bearing 108b is formed by the upper end surface of the bearing housing 111, the flat surface 104a on the lower side of the rotor hub, the axial minute clearance formed therebetween and the lubricating oil retained in the axial minute clearance.

The bush 105 has the FDB unit 108 fitted in an inner peripheral surface thereof, and an outer peripheral thereof is fitted into a hole 113 formed in the base plate 103. Furthermore, the stator 106 is attached to the bush 105.

An action and an effect of reducing vibration and noise by interposing the bush 105 between the FDB unit 108 and the base plate 103 are as described in the first embodiment.

Furthermore, in the present embodiment, by attaching the stator 106 to the base plate 103 via the bush 105, the noise generated by the stator 106 is reduced. That is, a silicon steel plate composing the stator 106 is a very hard steel material and can be pressed and fitted into the bush 105. When stainless steel or the like which is a material with a high mechanical strength is used as the bush 105, a sufficient sintering strength can be obtained as if the stator 106 and the bush 105 were integrated. Accordingly, a natural frequency and a vibration mode of the stator 106 are changed by fitting the bush 105, so that resonance with electromagnetic vibration can be reduced. Furthermore, in a joint part between the base plate 103 and the bush 105, friction or the like occurs, thereby damping the vibration. As a result, the noise generated by transmitting the vibration generated in the stator 106 to the base plate 103 can be reduced.

When the base plate 103 and the bush 105 are fixed by using an adhesive agent, the adhesive agent can act as an elastic body, thereby reducing the vibration.

Furthermore, in the present embodiment, a step is formed in an outer peripheral surface of the bush 105 to engage with a peripheral edge on the upper side of the hole 113. In this manner, positioning of the bush 105 and the base plate 103 in the axial direction is easily performed. The outer peripheral surface of the bush 105 may be shaped straight as shown in the first embodiment. Furthermore, the boss part 3a in the first embodiment may be formed in the base plate 103, so that the bush 105 and the base plate are brought into contact with each other only at a part corresponding to the inner peripheral surface of the boss part 3a.

Furthermore, for the FDB unit 108, other than one used in the present embodiment can also be used.

Furthermore, as a material of the bush 105, a material allowing for a large internal loss of a member and damping the vibration inside can also be used. For example, a damping material such as hard resin, natural rubber, synthetic rubber and Mg-Zr may be used.

Third Embodiment

The third embodiment is a modification of the second embodiment.

A motor of the third embodiment is one embodiment of the present invention, and has a structure as shown in FIG. 4. The way this motor 202 is mounted on a hard disk is similar to the first embodiment. Furthermore, the motor 202 in the present embodiment has a structure similar to that of the motor 102 of the second embodiment. That is, it is provided with a rotor hub 204, an FDB unit 208, a bush 205, a base plate 203, a stator 206, and a rotor magnet 207. Among these, the base plate 203, the stator 206, and the rotor magnet 207 are completely the same as the base plate 103, the stator 106 and the rotor magnet 107, respectively.

The FDB unit 208 of the present embodiment is provided with a shaft 209, a sleeve 210 opposed to an outer peripheral surface of the shaft 209 in a radial direction. Furthermore, in a lower end of the shaft 209, a thrust flange 219 is formed. In a bottom part of the FDB unit 208 opposed to a lower end surface of the thrust flange 219, a counter plate 111 is attached to seal a lower end of the FDB unit.

A radial dynamic pressure bearing 208a, similar to the first and second embodiments, is formed by the outer peripheral surface of the shaft 209 and an inner peripheral surface of the sleeve 210, a radial minute clearance formed by them, and lubricating oil retained in the minute clearance.

An upper end surface of the thrust flange 219 and a thrust surface 210a of the sleeve opposed to it are opposed to each other via a minute clearance in an axial direction and the lubricating oil is retained in the axial minute clearance. A thrust dynamic pressure bearing 208b is structured by the axial minute clearance, the upper end surface of the thrust flange 219 and the thrust surface 210a of the sleeve which composes the clearance, and the lubricating oil retained in the axial minute clearance.

In an outer peripheral surface of the sleeve 210, there is formed a step which changes a diameter of the outer peripheral surface between an upper part and a lower part in the axial direction, and in an inner peripheral surface of the bush 205, a step corresponding to the step is formed. By engaging the step formed in the outer peripheral surface of the sleeve 210 and the step formed in the inner peripheral surface of the bush 205, not only positioning in the axial direction is made easy but also a contact area is increased, so that a sintering strength can be increased between the members. This can reduce vibration transmitted to the base plate 203 through the dynamic pressure bearing unit 208, thereby reducing noise.

The scope of working of the present invention is not limited to the above-mentioned embodiments only, but various modifications and improvements can be made in the scope not departing from the scope of the present invention.

For example, as the bush, a material having a damping property may be used. For example, in metal containing magnesium (Mg), sintered metal having numerous vacancies inside or the like, an internal loss in the members is large and in the case where vibration is transmitted, the vibration is damped. Furthermore, these materials have such a mechanical strength as to be used as the bush, and have good workability. If sufficient processing accuracy and working accuracy can be attained, rubber and resin can be used as the bush. In particular, synthetic resin, synthetic rubber or the like containing metal, glass or the like, which is excellent in mechanical strength and can increase processing accuracy, is usable. The use of these materials can reduce not only noise of a high frequency but also vibration in a low frequency band.

Furthermore, a material having a large specific gravity can also be used for the bush. When the base plate is formed of the material having a large specific gravity, energy required for vibration becomes large, thereby making vibration hard, while the whole weight of the HDD becomes large. Consequently, by structuring iron, copper, zinc, tin and their alloys as the bush, the member hard to vibrate exists on a transmission path of the vibration, which makes the transmission of the vibration to the base plate hard. As a result, the noise is reduced.

Furthermore, FIG. 5 is a view showing another embodiment of the present invention. Only a part of an inner peripheral surface of the bush 305 is brought into contact with an FDB unit 308, and in the other part, a clearance is provided in a radial direction. This can reduce an area where the vibration is transmitted and suppress the transmission of the vibration.

What is claimed is:

1. A spindle used for a disk drive having a recording disk and a case,
   the spindle motor comprising a rotor part, a stator part and an FDB unit, wherein:
   the rotor part comprises a rotor hub rotating around a rotary axis integrally with the recording disk, and an annular rotor magnet attached to the rotor hub;
   the stator part has a stator opposed to a peripheral surface of the rotor magnet in a radial direction, around which a plurality of coils is wound, the base plate to which the stator is disposed and that consists the case of disk drive, and a bush member;
   the FDB unit comprises a shaft, a sleeve and a bearing housing, and the shaft and the sleeve are mutually supported rotatably by a dynamic pressure groove formed in at least one of opposed surfaces between the shaft and the sleeve and a lubricant retained therebetween to thereby support the rotor part rotatably around the rotary axis with respect to the stator part, and the bearing housing is formed with the sleeve integrally and provides the outer surface of the FDB unit; and
   the bush member of the stator part is interposed between an inner periphery of a motor attaching part provided in the base plate and an outer periphery of the FDB unit to fix and hold the FDB unit.

2. The spindle motor according to claim 1, wherein the shaft is joined or formed integrally to the rotor hub of the rotor part and rotates around the rotary axis.

3. The spindle motor according to claim 1, wherein a through-hole as motor attaching part is formed in the base plate, at least a part of inner peripheral surface of the bush member is fixed to an outer peripheral surface of the FDB unit, and at least a part of outer peripheral surface of the bush member is fixed to the through-hole.

4. The spindle motor according to claim 3, wherein the fixing of the bush member to the FDB unit and to the through-hole of the base plate is carried out via an adhesive agent.

5. The spindle motor according to claim 4, wherein the adhesive agent has an elastic coefficient value of 0.1 to $10 \times 10^3$ MPa.

6. The spindle motor according to claim 3, wherein the fixing of the bush member to the FDB unit and to the through-hole of the base plate is carried out by pressing and fixing.

7. The spindle motor according to claim 1, wherein the stator is fixed to the bush member.

8. The spindle motor according to claim 2, wherein in an inner peripheral part of the through-hole of the base plate, a cylindrical boss part extending in the rotary axis direction is provided, and the stator is fixed to an outer peripheral surface of the boss part.

9. The spindle motor according to claim 7, wherein a through-hole as a motor attaching part is formed in the base plate, at least a part of inner peripheral surface of the bush member is fixed to an outer peripheral surface of the FDB unit, and at least a part of outer peripheral surface of the bush member is fixed to the through-hole.

10. The spindle motor according to claim 9, wherein the fixing of the bush member to the FDB unit and to the through-hole of the base plate is carried out via an adhesive agent.

11. The spindle motor according to claim 9, wherein the adhesive agent has an elastic coefficient value of 0.1 to $10 \times 10^3$ MPa.

12. The spindle motor according to claim 9, wherein the fixing of the bush member to the FDB unit and to the through-hole of the base plate is carried out by pressing and fixing.

13. The spindle motor according to claim 8, wherein the bush member is brought into contact with the base plate only at the boss part.

14. The spindle motor according to claim 1, wherein the bush member is made of a material having a larger specific gravity than that of the base plate.

15. The spindle motor according to claim 1, wherein the bush member is made of a material having a damping property.

16. A recording disk driving device having at least one recording disk, comprising:
a case including base plate as a part thereof;
access means for reading information of the recording disk; and
spindle motor attached directly to the base plate,
the spindle motor comprising a rotor part, a stator part and an FDB unit,
wherein:
the rotor part comprises a rotor hub rotating around a rotary axis integrally with the recording disk, and an annular rotor magnet attached to the rotor hub;
the stator part has a stator opposed to a peripheral surface of the rotor magnet in a radial direction, around which a plurality of coils is wound, the base plate to which the stator is disposed and that consists the case of disk drive, and a bush member;
the FDB unit comprises a shaft, a sleeve and a bearing housing, and the shaft and the sleeve are mutually supported rotatably by a dynamic pressure groove formed in any at least one of opposed surfaces between the shaft and the sleeve and a lubricant retained therebetween to thereby support the rotor part rotatably around the rotary axis with respect to the stator part, and the bearing housing is formed with the sleeve integrally and provides the outer surface of the FDB unit; and
the bush member is interposed between an inner periphery of a motor attaching part provided in the base plate and an outer periphery of the FDB unit to fix and hold the FDB unit.

17. The recording disk driving device to claim 16, wherein the shaft is joined or formed integrally to the rotor hub of the rotor part and rotates around the rotary axis.

18. The recording disk driving device to claim 16, wherein a through-hole as the motor attaching part is formed in the base plate, at least a part of inner peripheral surface of the bush member is fixed to an outer peripheral surface of the FDB unit, and at least a part of outer peripheral surface of the bush member is fixed to the through-hole.

19. The recording disk driving device to claim 18, wherein the fixing of the bush member to the FDB unit and to the through-hole of the base plate is carried out via an adhesive agent.

20. The recording disk driving device to claim 19, wherein the adhesive agent has an elastic coefficient value of 0.1 to $10 \times 10^3$ MPa.

21. The recording disk driving device to claim 18, wherein the fixing of the bush member to the FDB unit and to the through-hole of the base plate is carried out by pressing and fixing.

22. The recording disk driving device to claim 16, wherein the stator is fixed to the bush member.

* * * * *